United States Patent
Roussie

(10) Patent No.: US 7,621,034 B2
(45) Date of Patent: Nov. 24, 2009

(54) TUBULAR THREADED JOINT WHICH IS IMPERVIOUS TO THE EXTERNAL ENVIRONMENT

(75) Inventor: Gabriel Roussie, Cappelle en Pevele (FR)

(73) Assignees: Vallourec Mannesmann Oil & Gas France, Aulnoye Aymeries (FR); Sumitomo Metal Industries, Ltd, Osaka-shi (JP)

( * ) Notice: Subject to any disclaimer, the term of this patent is extended or adjusted under 35 U.S.C. 154(b) by 624 days.

(21) Appl. No.: 10/525,023

(22) PCT Filed: Aug. 11, 2003

(86) PCT No.: PCT/FR03/02509

§ 371 (c)(1),
(2), (4) Date: Feb. 18, 2005

(87) PCT Pub. No.: WO2004/020889

PCT Pub. Date: Mar. 11, 2004

(65) Prior Publication Data

US 2006/0006600 A1   Jan. 12, 2006

(30) Foreign Application Priority Data

Aug. 29, 2002   (FR) .................................. 02 10727

(51) Int. Cl.
*B21D 39/00* (2006.01)
*F16L 17/00* (2006.01)
(52) U.S. Cl. ........................................ 29/456; 277/314
(58) Field of Classification Search .................. 29/456, 29/428, 436, 450, 505, 512, 516, 234, 255; 277/314; 285/334, 333; 403/258
See application file for complete search history.

(56) References Cited

U.S. PATENT DOCUMENTS

| 2,380,690 A | 7/1945 | Graham |
| 2,960,353 A | 11/1960 | Woodling |
| 4,878,285 A | 11/1989 | Carstensen |
| 4,988,127 A | 1/1991 | Carstensen |
| 6,254,017 B1 * | 7/2001 | Kuo ............................ 239/532 |

FOREIGN PATENT DOCUMENTS

| DE | 40 07 408 | 7/1991 |
| EP | 0 867 596 | 9/1998 |

* cited by examiner

*Primary Examiner*—John C Hong
(74) *Attorney, Agent, or Firm*—Oblon, Spivak, McClelland, Maier & Neustadt, L.L.P.

(57) ABSTRACT

A tubular joint including a conical male thread and a conical female thread. An annular housing is disposed close to a free end of the female element and is used to house a deformable sealing ring. The sealing ring is in sealed contact with the peripheral surface of the housing and with diminishing threads of the male thread and bears axially against a shoulder that faces the free end, thereby limiting the housing.

22 Claims, 2 Drawing Sheets

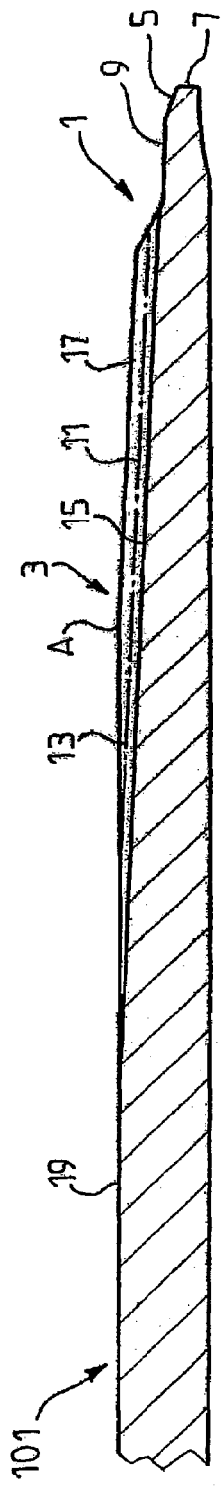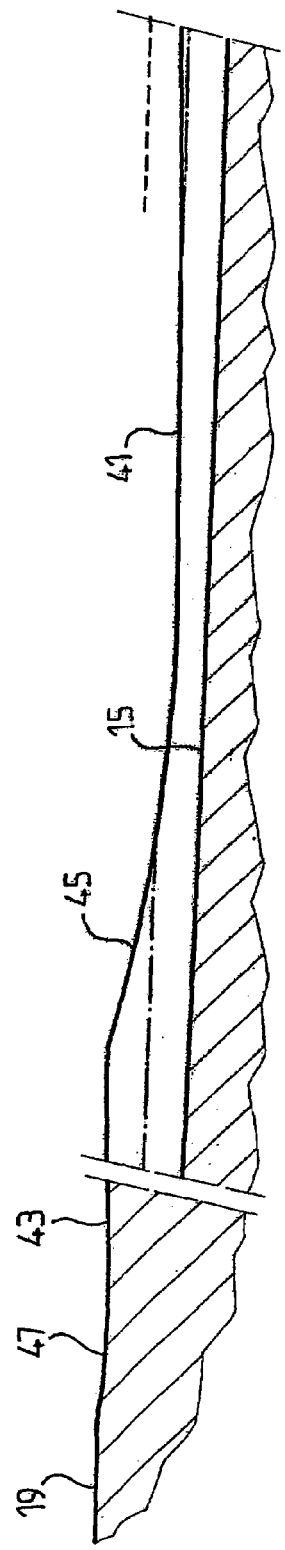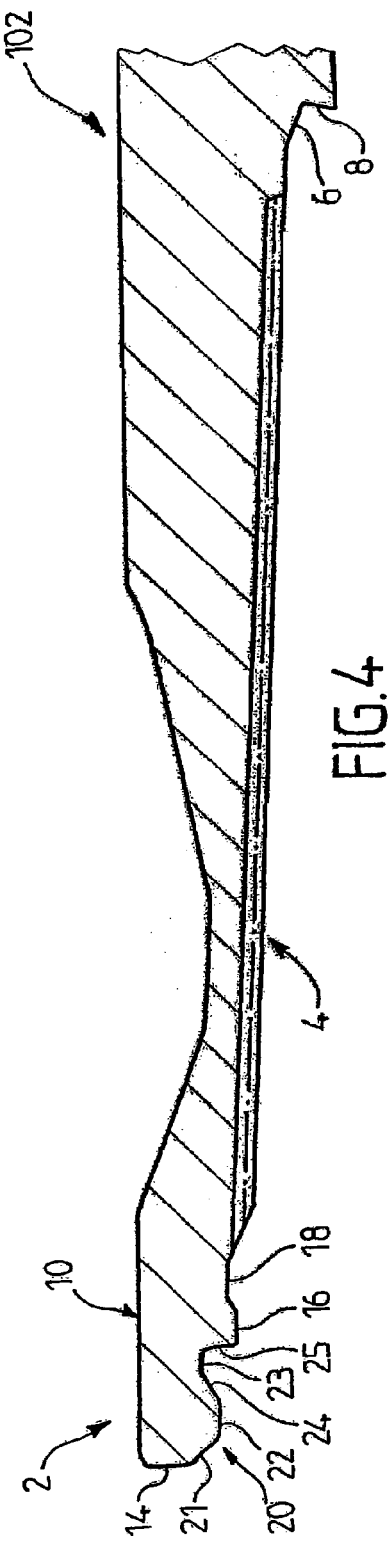

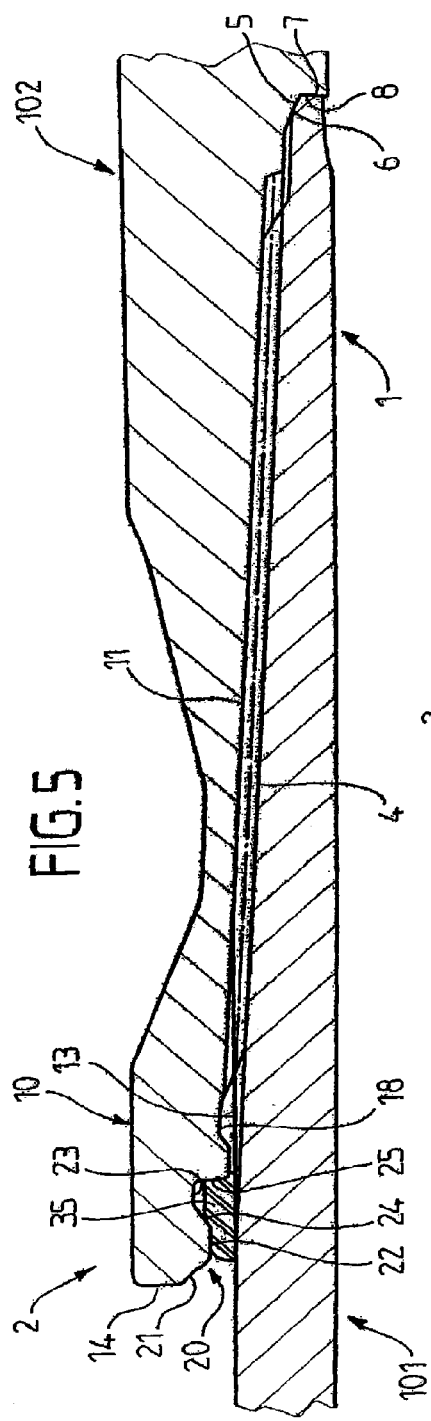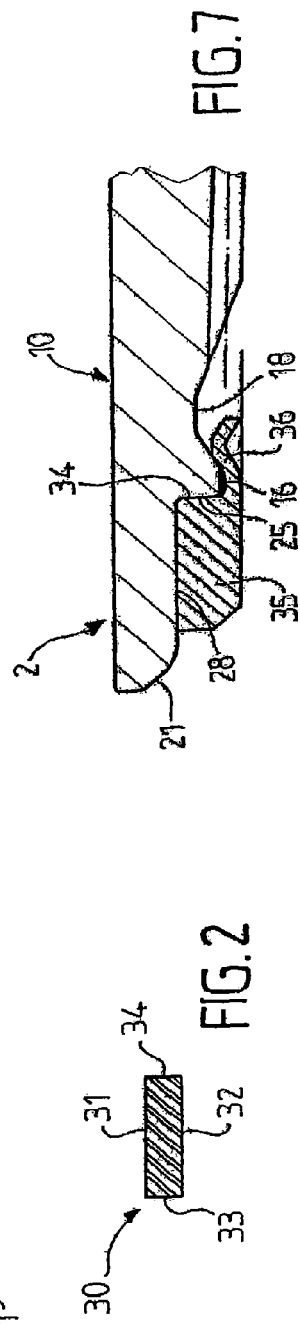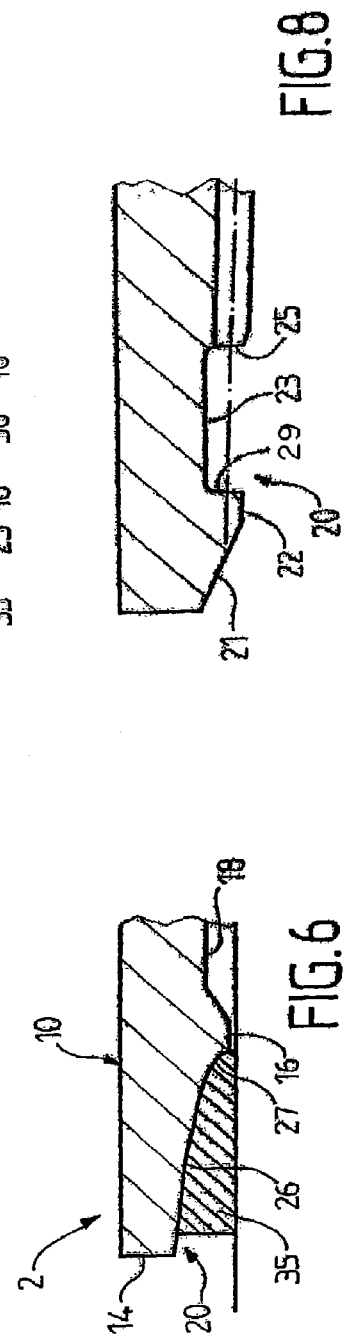

TUBULAR THREADED JOINT WHICH IS IMPERVIOUS TO THE EXTERNAL ENVIRONMENT

The invention relates to a method of producing a tubular threaded joint comprising a male tubular element having a conical male thread, a female tubular element having a conical female thread which interacts by screwing with the male thread, and a deformable sealing ring interposed between the male and female elements in such a way as to oppose the communication of fluid between the outside of the tubular joint and the zone of interaction of said threads, the sealing ring being in sealed contact with the male thread, and the female element having an annular housing to receive the sealing ring, disposed axially between its free end and the female thread and limited axially by a first shoulder facing said free end, the sealing ring bearing axially against said first shoulder and being in sealed contact with the peripheral surface of the housing.

Such tubular threaded joints are known in which the male element is formed at the end of a very long tube and the female element at the end of another very long tube or of a shorter tubular component such as a connection sleeve, these joints being used for end-to-end assembly of a multiplicity of tubes to form a column, particularly in hydrocarbon shafts, where this column is used for the exploitation of the hydrocarbons (column of production tubes) or to hold back the earth (column of lining tubes).

The American Petroleum Institute has for a long time defined specifications API 5B and 5CT for such threaded joints with conical threads and rounded triangular threads or with trapezoidal threads. These joints are however sealed only thanks to greases filled with solid particles which fill the helical spaces between the male and female threads.

A proposal has been made to improve the sealing characteristics of these joints, either by providing on the male and female elements metal sealing surfaces which are under mutual contact pressure thanks to a radial tightening, or by means of sealing rings made of deformable material such as polytetrafluoroethylene, or with the aid of a combination of these means.

EP 0 488 912 A describes a threaded joint having a frusto-conical metal sealing surface disposed at the end of the male threaded element and a corresponding metal sealing surface provided on the female threaded element. This threaded joint has excellent sealing characteristics with respect to fluids flowing either inside or outside the joint. However, fluid may infiltrate from the outside on some or all of the threads and cause risks of corrosion of the latter when the fluid is corrosive.

The same advantages and the same disadvantages are found in the threaded joint of DE 4 317 591 A, which presents a deformable sealing ring disposed in an annular groove of the female threaded element and pressed into the male threads in the vicinity of the free end of the male element.

Such an infiltration from the outside environment is particularly harmful in the case of threaded joints for submarine rising columns called "risers" disposed between the seabed and a marine platform for isolating submarine reservoir shaft production tubes from the sea water, the sea water being capable of causing severe corrosion in the extremely confined spaces between the male and female threads.

U.S. Pat. No. 5,687,999 A describes a threaded joint with conical threads having metal sealing bearing surfaces at the two longitudinal ends of the threads, and which should therefore be free of the aforementioned disadvantages. However, the cyclical stresses to which submarine columns are subjected due to the currents tend to create cracking of the sealing surfaces by the male and female surfaces sliding together. It is of course conceivable that this sliding could be prevented by placing the free ends of the threaded elements in axial abutment, but the result would be an increase of the thicknesses of the tubes at least at their ends and consequently an increase in their cost.

The aim of the invention is to eliminate the aforementioned disadvantages and consequently allow the production of a tubular threaded joint particularly well suited to submarine risers subjected to cyclical stresses.

The invention aims in particular to produce a tubular threaded joint whose male and female elements are very similar to those currently used for the columns of lining tubes, particularly with respect to their thickness, and are as a result cheap to produce.

The production of the tubular threaded joint according to the invention should also be as easily possible directly at the end of very long tubes (integral assembly) as between a tube and a sleeve intended and to connect two very long tubes (sleeved assembly).

The invention concerns in particular a method of the type defined in the introduction, and provides that a deformable sealing ring be placed around said male thread, the free end of the male element is engaged, and the male thread is screwed into the female thread, said sealing ring, during the screwing, being pushed along the male element by said first shoulder, rotated by the female element and compressed radially between the male thread, into which it is pressed, and said peripheral surface of the housing.

The terms "sealing" and "sealed contact" refer here to measures intended not necessarily to prevent any fluid making contact with the threads, but at least to limit such access thereto in such a way as to practically prevent a renewal of the fluid and consequently a marked corrosion.

Optional features of the invention, as additions or substitutes, are given below:

The sealing ring is made of a material chosen from synthetic materials, malleable metals and composite materials.

The sealing ring is made of a material having a low coefficient of friction with the material of the male element.

The sealing ring is made of filled or unfilled polytetrafluoroethylene.

The male thread comprises at the end opposite the free end of the male element of the threads called diminishing threads whose radial height usually diminishes from a nominal value to a zero value, and the sealing ring is in sealed contact with said diminishing threads over at least a portion of its axial length.

The sealing ring is in contact with said diminishing threads over all its axial length.

The sealing ring is placed around said diminishing threads.

The male element is machined, over at least a fraction of the axial length of the diminishing threads, to a constant diameter greater than the diameter of the troughs of the threads concerned.

The sealing ring is placed around the region of the male element machined to a constant diameter.

Said housing has a second shoulder axially facing the first shoulder and with a minimal diameter greater than that of the first shoulder, a portion of the volume of the sealing ring being compressed axially between the first and second shoulders.

The first shoulder, or at least one of the first and second shoulders, is inclined relative to the axis of the threads.

Said housing emerges at the free end of the female element in a flare.

The male element has, in the vicinity of its free end, an axial abutment surface suitable for interacting with an axial abutment surface of the female element to limit the screwing.

Additional sealing means are provided to prevent any communication of fluid between the interior of the tubular joint and the zone of interaction of the threads.

The sealing ring is screwed onto the male thread.

The sealing ring is placed around the male thread at a temperature such that its internal diameter is greater than the external diameter of the underlying threads, its internal diameter being less than the external diameter of the underlying threads at ambient temperature.

The sealing ring is an O-ring of rectangular section elongated in the axial direction.

The external diameter of the sealing ring after it has been placed around the male thread is slightly less than the minimal radius of the peripheral surface of said housing.

A further subject of the invention is a tubular threaded joint such as can be obtained by the method defined hereinabove, comprising a male tubular element having a conical male thread, a female tubular element having a conical female thread which interacts by screwing with the male thread, and a deformable sealing ring interposed between the male and female elements in such a way as to oppose the communication of fluid between the outside of the tubular joint and the zone of interaction of said threads, the sealing ring being in sealed contact with the male thread, and the female element having an annular housing to receive the sealing ring, disposed axially between its free end and the female thread and limited axially by a first shoulder facing said free end, the sealing ring bearing axially against said first shoulder and being in sealed contact with the peripheral surface of the housing.

The tubular threaded joint according to the invention may comprise at least some of the following particular features:

The first and second shoulders are respectively perpendicular to the axis of the threads and inclined relative to the latter.

The housing has a diameter constantly increasing toward the free end of the female element, its peripheral wall being greatly inclined relative to the axis of the threads at the end opposite said free end to form a shoulder capable of pushing the sealing ring when the threaded elements are screwed together, and its angle then decreasing progressively.

Said flare and the first shoulder are connected together by a cylindrical surface 28.

The features and advantages of the invention will be explained in greater detail in the following description with reference to the appended drawings.

FIG. 1 is a half-view in axial section of a male tubular element intended to form part of a tubular threaded joint according to the invention.

FIG. 2. is a half-view in axial section of a ring of sealing material intended to form, after the elements of FIGS. 1 and 4 are screwed together, the sealing ring of the tubular threaded joint according to the invention.

FIG. 3 is an enlarged detail of FIG. 1.

FIG. 4 is a half-view in axial section of a female tubular element intended to be associated with the male element of FIG. 1 to form the tubular threaded joint according to the invention.

FIG. 5 is a half-view in axial section of the joint assembled according to the invention.

FIGS. 6 and 8 are half-views in axial section of variants of the female lip of the female element, FIGS. 6 and 7 also showing the associated sealing ring.

The male threaded element of FIG. 1 is produced at the end of a very long tube 101. It comprises a continuous male conical thread 3 with trapezoidal threads. Over a portion 11 of its length, the thread 3 is formed of threads called perfect threads which have a thread height that is constant and equal to a nominal value between an envelope of thread troughs 15 and an envelope of thread peaks 17, both frustoconical. Over the remaining portion 13 of the thread, the threads are imperfect or diminishing with an envelope of frustoconical thread troughs extending that of the perfect threads, and an envelope of thread peaks consisting of the outer cylindrical peripheral surface 19 of the tube 101. Conditional upon the cylindrical machined surfaces described hereinafter, the diminishing threads therefore have a height that diminishes progressively from the aforementioned nominal value to a zero height.

In the absence of these cylindrical machined surfaces, the junction point A between the portions 11 and 13 of the thread correspond to the intersection between the envelope 17 of the peaks of the perfect threads and the peripheral surface 19. The thread being positioned precisely, by machining, relative to the free end 7 of the tube 101, the axial position of the point A depends on the effective external diameter of the tube, for which the tolerance is for example ±1% for seamless hot-rolled tubes.

The element 1 comprises a male lip 9 extending between its free end 7 and the thread 3. The free end may be defined by a flat surface perpendicular to the axis of the thread. Preferably, as shown, it is defined by a frustoconical concave surface 7 whose half-angle at the peak is for example 75°. This surface serves as an axial abutment when the male element is screwed into the female element, and its effects are described in greater detail in EP 0 488 912 A.

The end surface 7 is connected to a frustoconical sealing surface 5, as also described in EP 0 488 912 A.

It will be noted that no modification of the existing male elements is required to implement the invention.

FIG. 2 shows a ring 30 made of deformable sealing material, preferably with a low coefficient of friction, for example of polytetrafluoroethylene, glass fiber-reinforced polytetrafluoroethylene, polyamide or soft metal such as copper. The ring 30 has a toroidal shape of revolution with rectangular section and therefore has an external peripheral surface 31 cylindrical of revolution, an internal peripheral surface 32 cylindrical of revolution, coaxial with the surface 31, and two end faces 33, 34 that are flat and perpendicular to the axis of the surfaces 31, 32. The initial diameter of the internal surface 32 is advantageously slightly less than the external diameter of the tubular element 1 in the place where the ring is to be placed, for example less than the diameter of the external surface 19 for installation around the diminishing threads 13. The diameter of the external surface 31, and consequently the radial thickness of the ring 30, is chosen such as to allow the ring to be inserted into the housing provided for that purpose in the female element, during the screwing process, and the ring to have a sealed contact with the male and female elements at the end of the screwing process, as will be described hereinafter.

Since the external surface 19 of the tube 101 exhibits generally a certain ovalization, it is advantageous, as shown in FIG. 3, to remove or reduce this ovalization, on at least a part of the length of the threaded portion 13 with diminishing threads, by machining on a cylindrical surface of revolution. In the example of FIG. 3, two machined cylindrical surfaces are provided. A first cylindrical surface 41 of smaller diameter which begins in the threaded portion 11 and extends mainly into the threaded portion 13, and a second cylindrical surface 43 of larger diameter is connected to the surface 41 in a concave arc profile 45 and extends to the unthreaded portion of the tube 101, where it is connected to the external surface 19 in a concave arc profile 47. The diameter of the surface 41 and the axial position of the profile 45 are chosen such that the machining does not reach the envelope 15 of the thread troughs. The ring 30 is advantageously accommodated on the cylindrical surface 41. The surface 43 is used essentially to facilitate the insertion of the male element into the female element.

To place the ring 30 on the male element 1, it is advantageously heated to a temperature such that its internal diameter is greater than the external diameter of the male element at the place that is to receive it, for example greater than the diameter of the cylindrical surface 41. The ring may be positioned by means of a tool pressing on the abutment surface 7. After cooling, the ring is held in place by radial tightening on the male element.

The female threaded element 2 shown in FIG. 4 is made at the end of a short tube or sleeve 102 which allows an assembly called "threaded-sleeve coupling" of two very long tubes such as 101, the male threaded elements of the latter being screwed respectively into two female threaded elements formed at the two ends of the sleeve. As a variant, the female threaded element may be made at the end of a very long tube in such a way as to allow the latter to be assembled with the tube 101, the elements 1 and 2 then forming a threaded joint called integral.

The illustrated element 2 comprises a continuous female conical thread 4 with trapezoidal threads formed exclusively of perfect threads.

The geometric features of the threads 3 and 4 are designed to allow them to interact by screwing.

The element 2 has a female lip 10 extending beyond the thread 4 to its free end defined by a flat face 14 perpendicular to the axis of the tube 102. In an intermediate region of its length, the lip 10 has a slightly frustoconical internal surface 16 open to the free end 14 and having a minimal diameter slightly greater than the maximal diameter of the surface 19 of the tube 101. Either side of the surface 16, the lip is hollowed out internally to form, on the side of the thread 4, an annular groove 18 and, on the side of the free end 14, a housing 20 for the sealing ring. The thread 4 emerges in the groove 18 which makes it possible to disengage the tool used to make the thread. The housing 20 is delimited by a series of frustoconical, cylindrical and flat surfaces connected to one another by knuckles. A first frustoconical surface 21 forming an entry chamfer, to facilitate the insertion of the end of the male element, is connected to the end surface 14 and is followed by a cylindrical surface 22 of greater diameter than the surface 16. The surface 22 is connected to another cylindrical surface 23 of greater diameter by a frustoconical surface 24 facing away from the end 14, and a flat surface 25 perpendicular to the axis connects the cylindrical surfaces 16 and 23. The surfaces 21, 22, 23 and 24 thus define the peripheral surface of the housing, the minimal radius of the latter being that of the surface 22.

Beyond the thread 4 relative to the free end 14, the female element 2 has a frustoconical abutment surface 8 capable of interacting with the surface 7 of the male element, and a frustoconical sealing surface 6 capable of interacting with the sealing surface 5 of the male element.

When the elements 1 and 2 are screwed together, the ring 30, previously placed on the male element as described hereinabove, and whose external diameter is then slightly less than the diameter of the surface 22, fits inside the latter, after which it enters the enlargement delimited by the surfaces 23, 24 and 25. When it butts against the radial surface 25, the ring is pushed by the latter along the male element 1, and rotates with the female element relative to the male element. It deforms to enter the male threads and dilates while following the increasing diameter of the troughs of the diminishing threads.

The final state of the sealing ring is shown in FIG. 5. It is radially compressed between the surface 22 and the diminishing threads of the male element, in which it is pressed, over a fraction of its length, and extends toward the inside of the joint, along the male thread, while partially filling the aforementioned enlargement, up to the radial surface 25. In addition, a portion of the volume of the ring is axially compressed between the surfaces 24 and 25, contributing to the seal and the stability of the position of the ring. The axial length of the sealing ring corresponds at least to a half-pitch of the threads, and advantageously to a small multiple of the pitch.

The shapes of the housing 20 and of the ring 30 as described hereinabove are in no way limiting, and may be modified without departing from the invention. A few examples of such modifications are illustrated by FIGS. 6 to 8.

Thus, FIG. 6 shows a variant of the lip 10 of the female element 2 in which the housing 20 has a diameter constantly increasing from the cylindrical wall 16 to the free end 14, the peripheral wall 26 of the housing making a progressively decreasing angle with the axis of the tubes. This inclination is strong in the vicinity of the wall 16 to form a shoulder 27 which pushes the sealing ring when the threaded elements are screwed together. The initial ring 30 may here again have the rectangular cross section illustrated in FIG. 2.

In the variant of FIG. 7, the housing has an entry chamfer 21 and a shoulder 25 similar to those in FIG. 3, connected together by a cylindrical surface 28. The original ring forming the sealing ring 35 no longer has a rectangular profile, but, beyond the end face 34 which presses on the shoulder 25, has an appendage 36 in the form of a thin lip which covers the cylindrical surface 16 of the female element and enters the groove 18, thus coupling the ring to the female element.

FIG. 8 shows another variant in which the housing 20 has surfaces 21, 22, 23 and 25 similar to those indicated by the same reference numbers in FIG. 3, the frustoconical surface 24 being replaced by a flat surface 29 facing the shoulder 25. The sealing ring may originally have a rectangular section and be entirely housed, after screwing, between the shoulders 25 and 23. In this variant also, the groove 18 is removed, its function being performed by the annular space delimited by the surfaces 23, 25 and 29.

The invention claimed is:

1. A method of producing a tubular threaded joint including a male tubular element having a conical male thread, a female tubular element having a conical female thread that interacts by screwing with the male thread, and a deformable sealing ring interposed between the male and female elements so to oppose communication of fluid between an outside of the tubular joint and a zone of interaction of the male and female threads, the sealing ring being in sealed contact with the male thread, and the female element having an annular housing to receive the sealing ring, disposed axially between its free end and the female thread and limited axially by a first shoulder facing the free end, the sealing ring bearing axially against the first shoulder and being in sealed contact with a peripheral surface of the housing, the method comprising:

placing a deformable sealing ring around the male thread; thereafter engaging the free end of the male element; and screwing the male thread into the female thread, the sealing ring, during the screwing, being pushed along the male element by the first shoulder, rotated by the female element and compressed radially between the male thread, into which it is pressed, and the peripheral surface of the housing.

2. The method as claimed in claim 1, wherein the sealing ring is made of a material chosen from synthetic materials, malleable metals, and composite materials.

3. The method as claimed in claim 1, wherein the sealing ring is made of a material having a low coefficient of friction with the material of the male element.

4. The method as claimed in claim 1, wherein the sealing ring is made of filled or unfilled polytetrafluoroethylene.

5. The method as claimed in claim 1, wherein:
the male thread comprises at an end opposite the free end of the male element of the threads diminishing threads whose radial height diminishes from a nominal value to a zero value, and
the sealing ring is in sealed contact with the diminishing threads over at least a portion of its axial length.

6. The method as claimed in claim 5, wherein the sealing ring is in contact with the diminishing threads over all its axial length.

7. The method as claimed in claim 6, wherein the sealing ring is placed around the diminishing threads.

8. The method as claimed in claim 6, wherein the male element is machined at a region, over at least a fraction of an axial length of the diminishing threads, to a constant diameter greater than a diameter of troughs of the threads concerned.

9. The method as claimed in claim 8, wherein the sealing ring is placed around the region of the male element machined to a constant diameter.

10. The method as claimed in claim 1, wherein the housing includes a second shoulder axially facing the first shoulder and with a minimal diameter greater than that of the first shoulder, a portion of a volume of the sealing ring being compressed axially between the first and second shoulders.

11. The method as claimed in claim 10, wherein at least one of the first and second shoulders is inclined relative to the axis of the threads.

12. The method as claimed in claim 1, wherein the housing emerges at the free end of the female element in a flare.

13. The method as claimed in claim 1, wherein the male element includes, in a vicinity of its free end, an axial abutment surface configured to interact with an axial abutment surface of the female element to limit the screwing.

14. The method as claimed in claim 1, further comprising additional sealing means for preventing any communication of fluid between the interior of the tubular joint and the zone of interaction of the threads.

15. The method as claimed in claim 1, wherein the sealing ring is screwed onto the male thread.

16. The method as claimed in claim 1, wherein the sealing ring is placed around the male thread at a temperature such that its internal diameter is greater than the external diameter of underlying threads, its internal diameter being less than an external diameter of the underlying threads at ambient temperature.

17. The method as claimed in claim 1, wherein the sealing ring is an O-ring of rectangular section elongated in the axial direction.

18. The method as claimed in claim 17, wherein an external diameter of the sealing ring after being placed around the male thread is less than a minimal radius of the peripheral surface of the housing.

19. A tubular threaded joint comprising:
a male tubular element having a conical male thread;
a female tubular element having a conical female thread which interacts by screwing with the male thread; and
a deformable sealing ring which interposes after tightening between the male and female elements in such a way as to oppose the communication of fluid between the outside of the tubular joint and the zone of interaction of said threads,
the female element having an annular housing disposed axially between its free end and the female thread and axially limited by a first shoulder facing said free end,
wherein the deformable sealing ring is fixed on the male element to be in sealed contact with the male thread, in that the external diameter before insertion of the ring is slightly less than the internal diameter of the housing, so that during tightening, the housing receives the sealing ring which bears axially against the first shoulder and comes into sealed contact with the peripheral surface of the housing.

20. The tubular threaded joint as claimed in claim 19, further comprising a second shoulder wherein the first and second shoulders are respectively perpendicular to the axis of the threads and inclined relative to the latter.

21. The tubular threaded joint as claimed in claim 19, wherein the housing has a diameter constantly increasing toward the free end of the female element, its peripheral wall being greatly inclined relative to the axis of the threads at the end opposite the free end to form a shoulder capable of pushing the sealing ring during screwing of the threaded elements, and its angle then decreasing progressively.

22. The tabular threaded joint as claimed in claim 19, wherein a flare and the first shoulder are connected together by a cylindrical surface.

* * * * *